(12) United States Patent
Chih

(10) Patent No.: US 6,334,175 B1
(45) Date of Patent: Dec. 25, 2001

(54) SWITCHABLE MEMORY SYSTEM AND MEMORY ALLOCATION METHOD

(75) Inventor: David Chih, Scarborough (CA)

(73) Assignee: ATI Technologies, Inc., Ontario (CA)

( * ) Notice: Subject to any disclaimer, the term of this patent is extended or adjusted under 35 U.S.C. 154(b) by 0 days.

(21) Appl. No.: 09/120,592

(22) Filed: Jul. 22, 1998

(51) Int. Cl.[7] .............................. G06F 12/00; G06F 3/00; G06F 13/00

(52) U.S. Cl. .................. 711/170; 711/171; 711/147; 711/153; 711/173; 710/51; 710/131

(58) Field of Search .............................. 711/5, 147, 148, 711/153, 170, 171, 173; 708/408, 406, 407; 710/131, 20, 21, 51

(56) References Cited

U.S. PATENT DOCUMENTS

| | | | | |
|---|---|---|---|---|
| 4,413,315 | * | 11/1983 | Kurakake | 364/200 |
| 4,908,789 | * | 3/1990 | Blokkum et al. | 364/900 |
| 5,392,252 | * | 2/1995 | Rimpo et al. | 365/230.02 |
| 5,577,215 | * | 11/1996 | Lee et al. | 395/311 |
| 5,684,973 | * | 11/1997 | Sullivan et al. | 395/405 |
| 5,845,093 | * | 12/1998 | Fleming | 708/407 |
| 5,848,258 | * | 12/1998 | Fenwick et al. | 395/405 |
| 6,038,630 | * | 3/2000 | Foster et al. | 710/132 |
| 6,118,462 | * | 9/2000 | Margulis | 345/521 |
| 6,125,421 | * | 9/2000 | Roy | 711/5 |

* cited by examiner

Primary Examiner—Do Hyun Yoo
Assistant Examiner—Kimberly McLean
(74) Attorney, Agent, or Firm—Vedder, Price, Kaufman & Kammholz

(57) ABSTRACT

A memory allocator employs a programmable and controllable switching circuit which switches multiple address buses and multiple data buses connected to the digital signal processing unit to differing banks of memory depending upon determined system requirement data, such as the amount of program memory and data memory necessary for a particular application. The memory space may be separate banks of memory incorporated into pools of memory if desired. The controllable switching circuit multiplexes the appropriate address bus and data bus to a given memory block or blocks which may be independent and can still be dedicated to specific application tasks. The memory banks are normal single address port and single data-port banks but are allowed to be connected to multiple data buses and address buses through the switching circuit. The switching circuit is sized to allow access to a subset of banks in a pool of banks associated with a given memory port. The digital signal processor is a multi-port device.

18 Claims, 5 Drawing Sheets

SWITCHABLE MEMORY SYSTEM AND MEMORY ALLOCATION METHOD

BACKGROUND OF THE INVENTION

The invention relates generally to systems and methods for allocating memory space on integrated circuits and more particularly to systems and methods for allocating memory accessible by multiple digital signal processing devices.

Integrated circuits employing digital signal processors (DSPs), such as digital audio processing devices and other processing devices, may have a limited fixed amount of memory integrated onto a common integrated circuit or located on a shared circuit board containing the digital signal processor(s). The memory for the digital signal processor(s) may be relatively expensive compared to other circuits and components in the system. An improper use of memory can result in system inefficiencies and weak system performance. Hence the trade-off between cost and performance is a constant challenge for computer system designers.

DSP cores are optimized to provide high performance arithmetic functions. However, the DSP core performance is only part of the solution of an optimized DSP architecture. Most DSP algorithms require a large amount of data to be moved between the DSP and its memories in order to keep up with the execution of the DSP and storing of the results. Therefore, the organization of the memories and its architecture is as vital to the overall DSP performance as the DSP core. From an economic view, DSP software applications will require more and more memories, and the ratio of area between the DSP and its memories will widen in the future. Therefore, optimized memory usage for both data and program should be a major consideration in the DSP and memory architecture.

One type of known architecture that attempts to strike a suitable balance between cost and performance includes a digital signal processor with one memory having different mapped locations. A single address bus and data bus is used to communicate information between the DSP and the memory. With such systems however, processing of audio information using digital filters that require many multiply and accumulate calculations, typically operate too slowly since the digital signal processor is unable to do simultaneous calculations. Hence such systems are not typically flexible enough for many applications.

To overcome associated problems with such designs another known design uses a multiport DSP architecture and allocates separate buses linked with separate types of memory spaces. For example such a system may use a dedicated port for accessing dedicated memory space for storing the program code, a dedicated port for accessing dedicated memory space for storing left data and another dedicated port for accessing dedicated memory space for storing right data. As such, the digital signal processor typically has a program port, a left data port and a right data port to facilitate multi-operand multiplication in one clock cycle. When the DSP is used for different software applications, such as when digital audio is in MPEG or a AC-3 format, the new application must be partitioned properly and loaded into the appropriate DSP memory block for processing each type of audio format. Although such systems may be more flexible and deliver superior performance than single port systems, they can be inefficient in memory usage when supporting different types and sizes of applications since the memory blocks are fixed in size and dedicated for usage for a given port.

For example, where digital audio streams are being processed in real time, the memory may be allocated solely for the processing of the real time information thereby negating use of the memory for any other background application. Also, not all of the memory block may be fully utilized where the application requires very little memory, and any unutilized memory is not accessible by any other ports or even other DSPs. This problem may become a serious issue when there are multiple digital signal processors each requiring dedicated but limited size blocks of memories for its own ports.

In the most primitive single block memory architecture, the operation of the FIR will require four cycles to complete. The Harvard architecture refers to a memory architecture where the processor can access two independent memory blocks (one for program and the other for data) via two independent sets of buses. Two memory accesses can be performed in a single cycle and thus the cycle requirement is reduced by 50%. In the Modified Harvard architecture, one memory block is for both program and data, while the other is for data only. Many DSP cores have taken the Modified Harvard architecture concept a bit further by providing another data memory block in addition to the program/data memory block and the data memory block Therefore, three independent memory accesses can be performed in a single cycle which allows the fetching of the instruction, the fetching of the data, and the fetching of the coefficient be all done in a single cycle. Then storing the result of the execution is performed in the next cycle. One disadvantage of the Modified Harvard architecture is the segmentation of the memory blocks. Different DSP applications have different program and data memory requirements and therefore such architectures can make inefficient use of memory.

Accordingly, it would be desirable to have a memory allocation system and method that facilitates improved use of available memory to accommodate multiple sized software applications.

DETAILED DESCRIPTION OF THE INVENTION

A memory allocator employs a programmable and controllable switching circuit which dynamically switches multiple address buses and multiple data buses connected to the digital signal processing unit to differing banks of memory depending upon determined system requirement data, such as the amount of program memory and data memory necessary for a particular application. The memory space may be separate banks of memory incorporated into pools of memory if desired. The controllable switching circuit multiplexes the appropriate address bus and data bus to a given memory block or blocks which may be independent and can still be dedicated to specific application tasks. The memory banks are single port banks which can be connected to multiple data and address through switching circuit. The switching circuit is sized to allow access to a subset of banks in a pool of banks associated with a given memory port. The digital signal processor is a multi-port device.

In one embodiment a multiport digital signal processing unit has multiple address and data buses coupled to access corresponding different types of memory space associated with each of the multiple ports. The controllable switching circuit is configured to provide programmable memory allocation of the different types of memory space for a non corresponding set of address and data buses and is also configured to provide concurrent access to more than one set of address and data buses to each of the different types of memory spaces. The banks of memory may be the same size in a given pool or may be different sizes in a given pool. The system also allows, if desired, a generation of memory allocation requirement data which is then used by a programmable switching circuit to select the appropriate memory banks for a given address and data bus or set of address and data buses depending upon the application being run by the digital processing unit.

In another embodiment, multiple digital signal processors are coupled to the controllable switching circuitry to allow sharing of memory banks associated with different types of memory space for the other DSP such that either DSP may utilize a bank of memory depending upon a given application being run by a given DSP at any time.

Figure 1A:
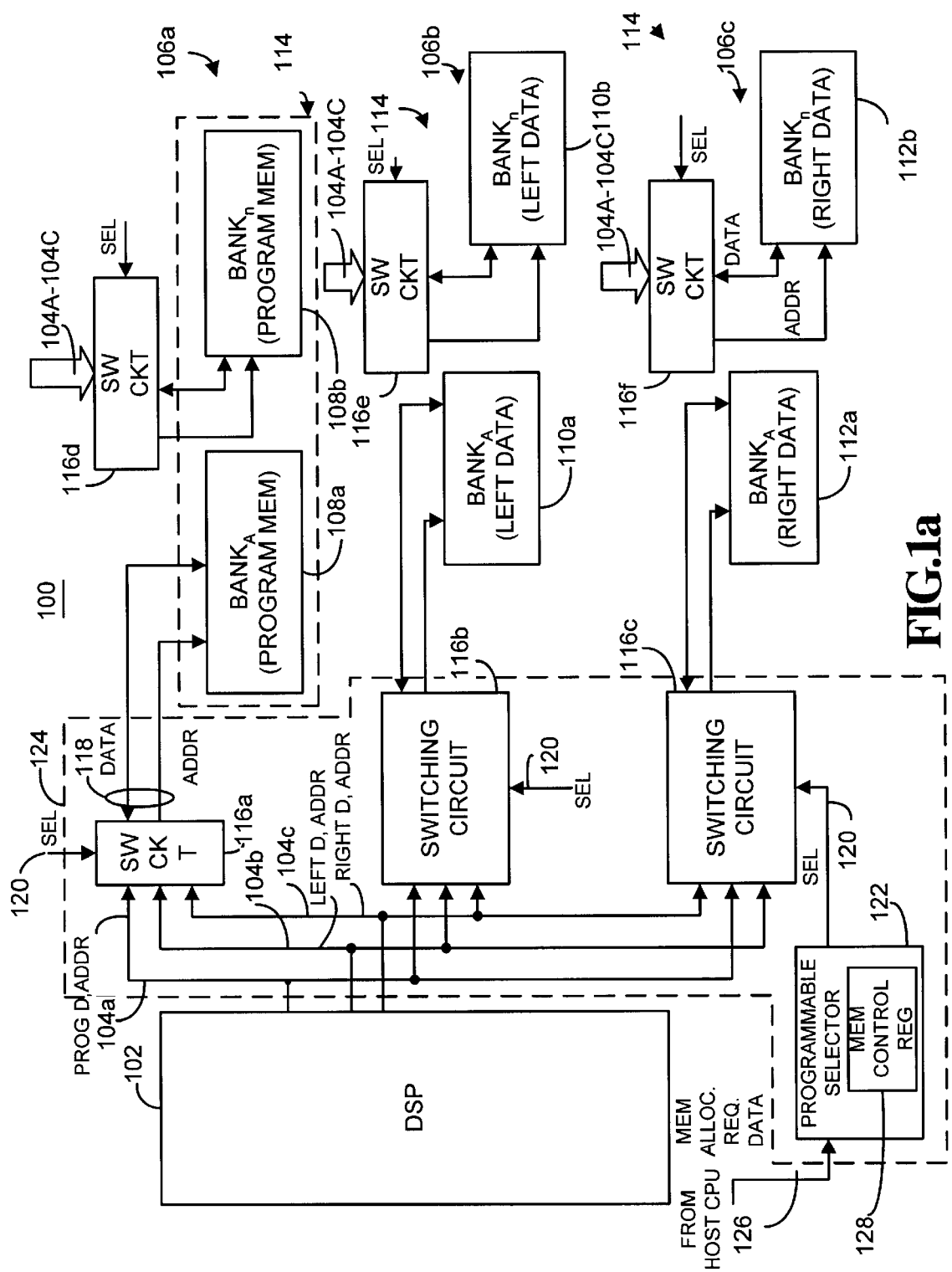
FIG. 1a is a block diagram generally illustrating a memory allocator in accordance with one embodiment of the invention.

FIG. 1a shows an example of one embodiment of a memory allocator 100 having a multiport digital signal processor 102 which has multiple address buses and multiple data buses 104a, 104b and 104c coupled to access corresponding different types of memory space generally indicated as 106a, 106b and 106c respectively. For example, address and data bus 104a corresponds to for example, memory space 106a typically dedicated for program memory. Likewise, address and data bus 104b corresponds to memory space 106b containing memory for storing left data. Similarly, address and data bus 104c corresponds to memory space 106c typically dedicated for storing right data. Left data is the data stored in the left data memory, right data is the data stored in the right data memory. For example, if the DSP wishes to do the multiplication operation A×B=C in one single cycle, the DSP stores A as left data in left date memory, B as right data in right data memory, and the DSP obtains A and B from both left and right data memories simultaneously to perform the entire multiplication operation in one single cycle. Each type of memory space 106a through 106c has at least two banks of memory 108a and 108b similarly left data memory space 106b includes a bank of memory 110a and another bank of memory 110b. In addition, right data type memory space 106c includes a plurality of banks of memory 112a and 112b.

By way of example, the memory allocator 100 also includes a multiport switching circuit dedicated to each bank of memory in each type of memory space 106a–106c. A plurality of banks is referred to herein as a pool of banks 114. Accordingly, a multiport switching circuit 116a is coupled to the DSP 102 through the multiple address and data bus 104a–104c and selects a given address and data bus pair 118 based on a select signal 120 which is generated by a programmable selector 122, such as a programmable register. A multiport switching circuit 116b is coupled between the left data bank memory space 106b and the multiple address and data buses 104a–104c. Similarly, the multiport switching circuit 116c is coupled to select an address and data bus pair for the right data memory space 106c from the multiple address and buses 104a–104c. Additional switching circuits 116d–116f are likewise connected to other memory banks. The set of multiport switching circuits 116a–116f in the programmable selector 122 form a controllable switching circuit 124 that is configured to provide programmable memory allocation of the different types of memory space 106a through 106c for a non corresponding set of address and data buses. For example, program port, bus pair 104a, is selected to correspond to the program memory space 106a by default such that only program code is stored in this memory space. However, if a bank or entire pool of this memory space is needed as data memory, the non corresponding data ports using bus pairs 104b and 104c are connected via the switching circuit 116a.

Conversely, the DSP 102 may in addition to utilizing corresponding memory space 106a for program memory may also use for example, bank 110a normally corresponding to left data memory space 106b where additional program memory is required. As such, the controllable switching circuit 124 is configured to provide concurrent access to more than one set of address and data buses to each of the different types of memory spaces 106a through 106c.

The banks of memory 108a, 108b, 110a, 110b, 112a and 112b, may be different sizes with respect to one another and may be of the same size or different sizes within a given pool. However, for purposes of illustration the memory banks for programmable memory space 106a are shown to be the same size whereas the pool of memory banks for the left data memory space 106b are the same size but smaller than the banks associated with the programmable memory space 106a. The switching circuits 116a–116f serve as the switching circuit which is coupled to each bank of memory. The programmable selector 122 controls the select signal 120 (SEL) on each switching circuit 116a–116f to select a bank of memory based on memory allocation requirement data 126.

The memory allocation requirement data 126 is determined by the host processor and is data representing, for example, the amount of memory required in each type of memory space by an application. This may be based on for example the size of the program, the required size of the left data memory for a given application, the required size of the right data for the given application, the number of instructions per second processed by the DSP and the mode of memory, such as whether each word is an 8 bit word length, 32 bit word or 64 bit word. The programmable selector 122 includes a memory control register 128 which stores data representing the banks that are required to meet the memory allocation requirement data 126.

Figure 1B:
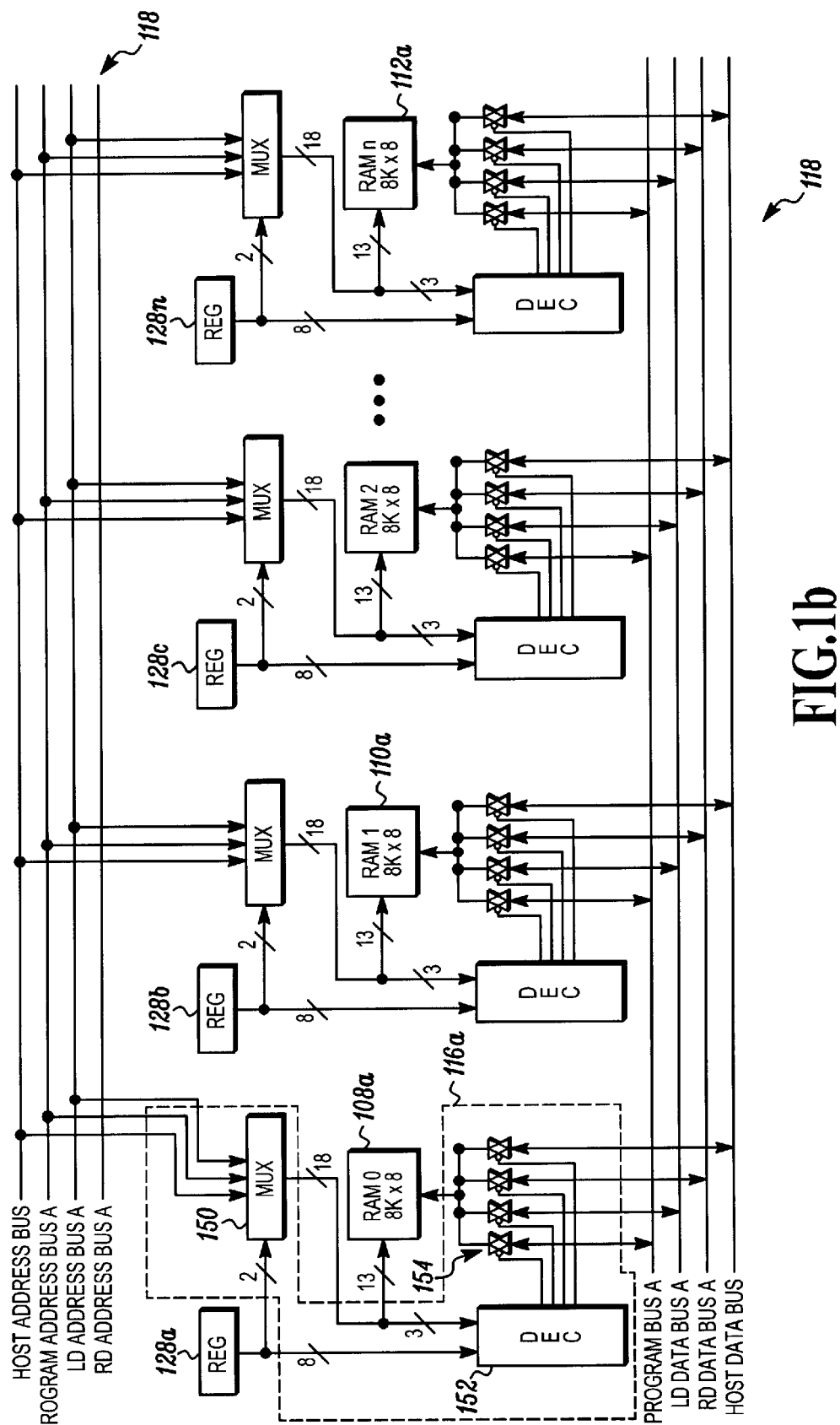
FIG. 1b is a block diagram illustrating one embodiment of a memory allocation arrangement in accordance with the invention.

FIG. 1b is a circuit diagram illustrating an example of one implementation of the switching circuits 116a–116f and the programmable selector 122. In this example, the overall memory is divided into multiple 8K×8 banks shown as 108a, 110a and 112a. Each bank of memory has a 5-bit memory bank register referred to herein as the memory control registers 128a–128n. The switching circuits 116a–116f each include a bank address multiplexer 150, a memory bank address decoder 152 and a set of bidirectional tri-state buffers 154. In this example, two-bits are used as memory type identification data that specifies the usage type of a given memory bank. The memory type identification data controls the selection between the three memory address buses or an address counter of the host interface into the memory. For example, a 00 may indicate that the memory bank is program memory whereas a 01 may indicate that a memory bank is a right memory bank.

Three bits are used as the memory address control data to control the mapping of the memory bank within a same type of memory block if the memory is laid out in banks of the same memory type or other grouping. The combination of the memory type identification data and the memory address data controls the memory output multiplexing onto the three different memory data buses or the host data bus.

With this technique, program memory, left data memory and right data memory can occupy any multiple 8K×8 banks (or any other suitable sizes) in the overall memory, and thus provide more efficient use of memory with different DSP applications. In addition, the host can have unlimited accesses to the DSP's memories and thus provide a simple mechanism for the download and reloading of memory content.

Figure 2:
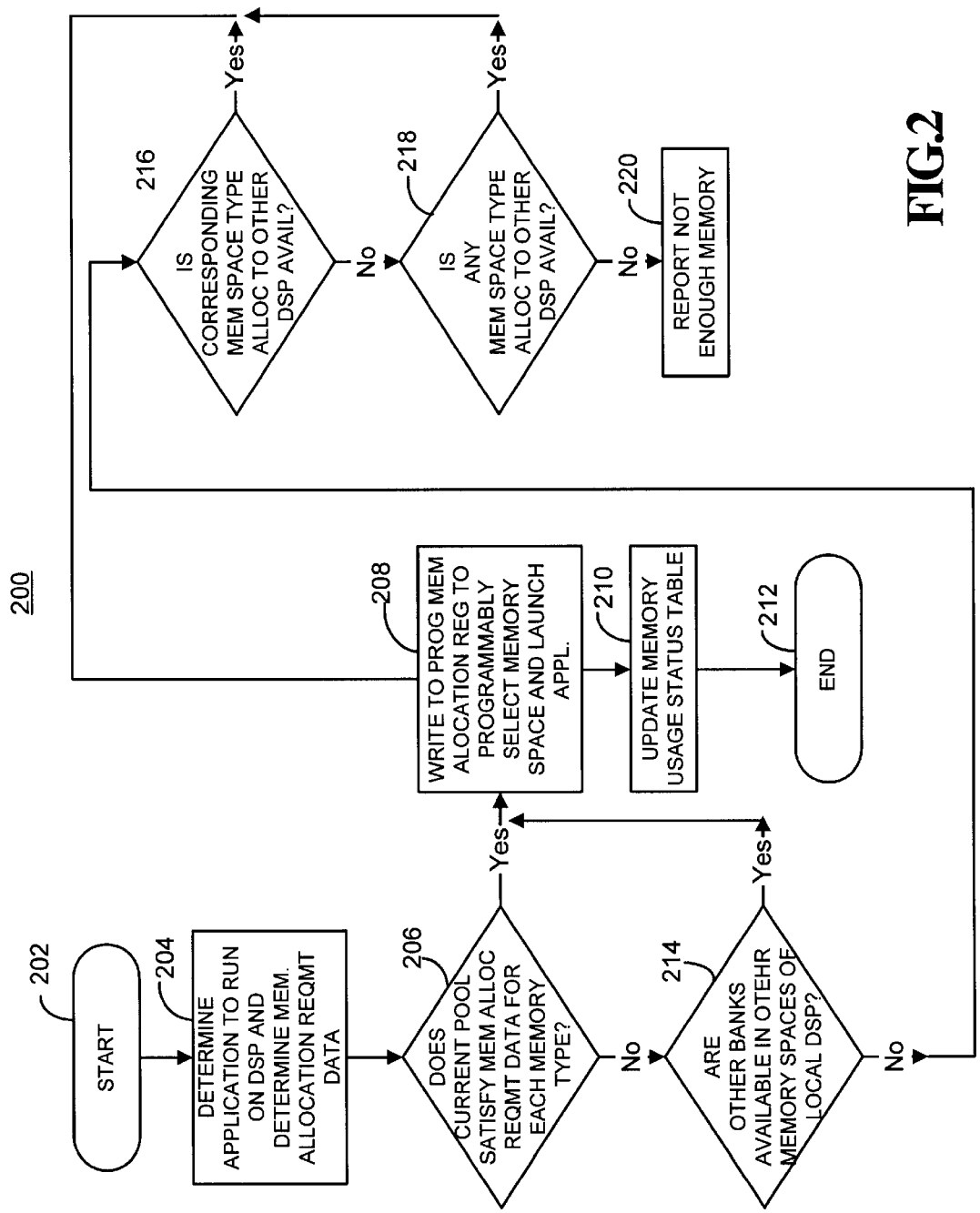
FIG. 2 is a flow diagram generally illustrating the operation of a memory allocation method in accordance with one embodiment of the invention.

FIG. 2 is a flowchart showing an example of the operation of the memory allocator of FIG. 1. The method of memory allocation 200 begins at block 202 wherein a host processor or other suitable processor indicates that a given application needs to be run on the DSP 102. For purposes of illustration, the application may be for a digital audio processing program which may require, for example, real time filtering and mixing of digital audio data of a given audio stream at a selected sampling rate. Upon receipt of notification that a given application is to be run, the DSP 102 determines the application that is to be run and determines the memory allocation requirement data 126 as shown in block 204. This may be done for example by receiving, from the host processor, data representing the size of the program to be run, a required size of the left data memory type, a required size of the right data memory type and the mode of the memory, such as whether the program will utilize 8 bit word lengths, 32 bit word lengths, or 64 bit word lengths or some other suitable word length. The DSP stores therein data representing the instruction per second processing capability of the DSP. The memory allocation requirement data 126 is dynamically determined on a per application basis each time a new application is run.

As shown in block 206, using the allocation requirement data, the host processor determines whether the corresponding pools, for each given memory type satisfy the memory allocation requirement data for each memory type. If the corresponding different types of memory space such as 106a, 106b and 106c satisfy the memory allocation requirement, meaning that the default memory space size for each port has enough memory, the programmable selector 122 writes to the memory control register to programmably select the default memory space and launch the application as shown in block 208. Therefore, where the corresponding address and data buses coupled to corresponding different types of memory satisfy the memory allocation requirement data, the programmable selector 122 generates the select signal 120 to select the memory space 106a for program memory port bus pair 104a, memory space 106a for bus pair 104b and memory space 106c for bus pair 104c associating corresponding memory banks for each type of memory space. Once the memory space has been selected, the programmable selector 122 updates memory usage status table data, stored in the programmable selector or other suitable location, to indicate which banks of memory are being used by the application as shown in block 210. Current memory usage status table data is used so that when another application, such as a concurrent application, must be run the memory that has already been allocated to a previous application is not reused. The DSP 102 waits for another message from the host processor indicating that another application needs to be run as shown in block 212.

Referring back to block 206, if the current corresponding memory types with the corresponding address and data buses do not satisfy the memory allocation requirement data, the programmable selector 122 looks at the update memory usage status table to determine whether other banks of memory are available in other memory spaces of the local DSP 102 as shown in block 214.

If other banks are available, based on the memory usage table, data and other memory spaces on the local DSP, the programmable selector 122 writes to the program memory allocation register (i.e. the memory control register 128) to select the appropriate banks to the multiplexers 116a 116f and launches the application as shown in block 208. If however there are no available banks in any other memory spaces of the local DSP, the programmable memory selector looks at the update memory usage status table to determine whether corresponding memory space types that are allocated to another DSP are available, as shown in block 216. If no corresponding memory space types that are allocated to another DSP are available, the programmable selector 122 determines whether any memory space type allocated to the other DSP is available as shown in block 218. If no memory space is available, the programmable selector reports to the DSP 102 that there is not enough memory to run the application as shown in block 220. Otherwise the programmable selector writes to the memory controller register 128 to programmably select the available memory as shown in block 208.

The data in the memory control register 128 may include data representing group mapping data which includes for example memory type data and bank identification data. For example, group mapping data may map a group of banks by the associated memory type such that banks 110a and 110b would be associated with left data memory type 106b. In addition each bank may have its own identification data so that bank 108a, 108b, 110a, 110b, 112a and 112b each have their own identification information so that when stored in the memory status update table, the programmable selector can easily identify from the update table which bank is being used at any given time. The memory type data may include data representing the type of memory space. For example, memory space 106a is memory space, whereas memory space 106b and 106c and for storing program code or program space for storing left data or right data.

Figure 3A:
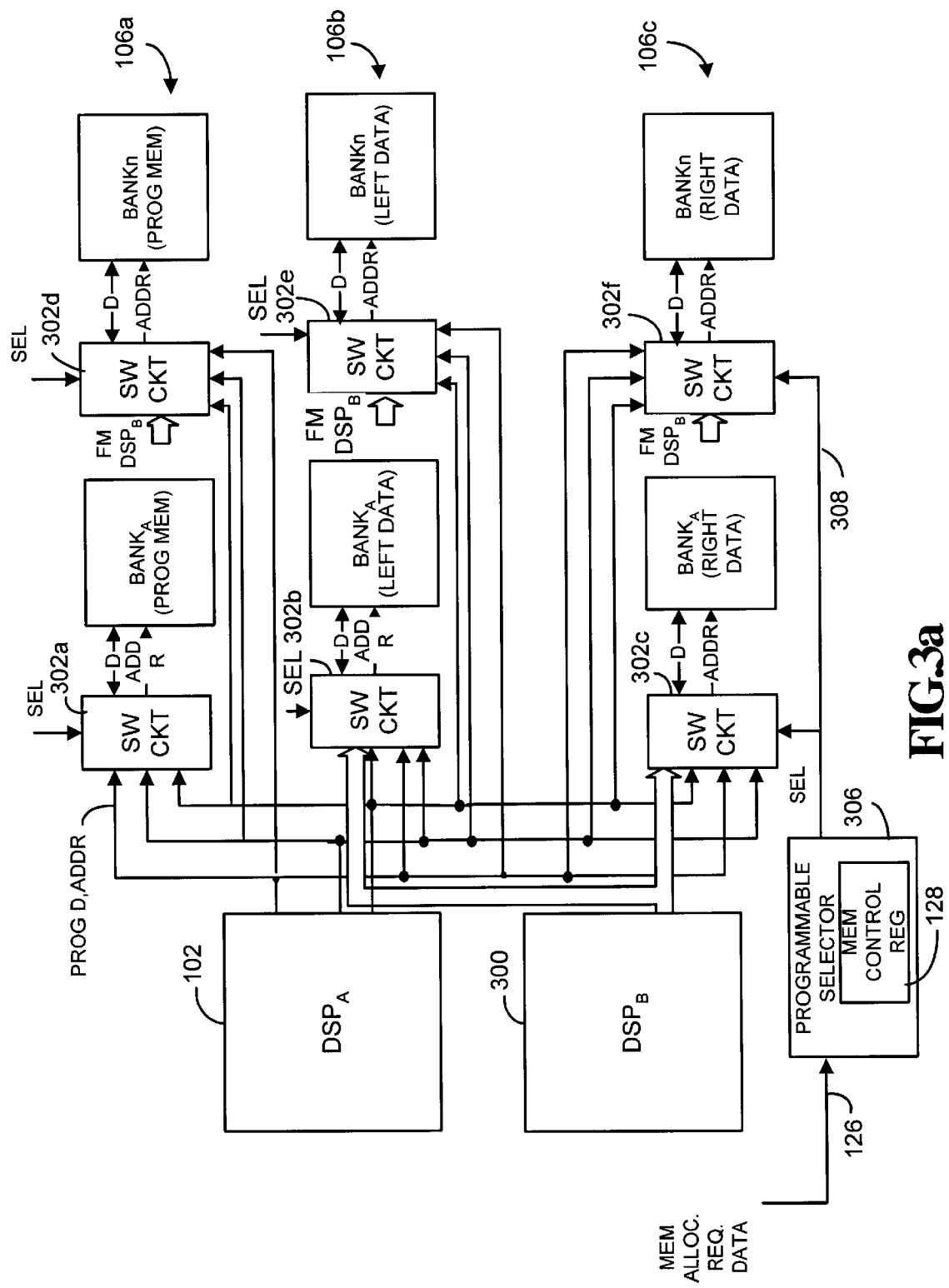
FIG. 3a is a block diagram generally illustrating an alternative embodiment of a memory allocator in accordance with one embodiment of the invention.

FIG. 3a shows an alternative embodiment of a memory allocator which operates in the same way as previously described with respect to FIG. 2. However, multiple DSPs 102 and 300 are used with bank dedicated multi-port switching circuit 302a–302f. The bank dedicated multiport switching circuit 302a–302f receive, in addition to the buses shown in FIG. 1a, the additional data and address buses from DSP 300 as shown by bus arrows 304. As with the system of FIG. 1a, the programmable selector 306 now may select any suitable switching circuit to effect memory space allocation as described with reference to FIG. 2. As shown, a dedicated switching circuit is provided for each bank of memory. However it will be recognized that any suitable switching structure may be used. As such, the digital signal processor 300 also has multiple address and data buses 304 that are coupled to access the corresponding different types of memory space 106a through 106c. The programmable selector 306 is connected to each of the multiplexing circuits 302a–302f through select line 308 and selects banks of memory based on memory allocation requirement data 126 corresponding to each of the DSPs 102 and 300 in the same way as previously described. For example, the host processor determines each DSP's memory allocation requirement for a given application at any given time and sends the memory allocation data 126 to the programmable selector 306 which then selects the appropriate banks in view of the memory allocation requirement data.

It will be recognized that the functionality of the programmable selectors 122 and 306 may be combined or moved to the DSP and that the programmable selectors may be incorporated into each or one the DSPs if desired. In addition, it will be recognized that any suitable multiplexing or switching circuit may also be used. In view of the above structure and operation, the disclosed system may accommodate varying sized program applications continuously while maximizing memory usage since any memory bank may be used by any digital signal processing port on any multiport DSP or may be used in a traditional dedicated port manner wherein memory space is dedicated to a specific data type. Hence, independent memory banks can be dedicated to specific tasks or to corresponding memory type tasks such as program memory, left data memory and right data memory. Moreover the memory banks are multi-port memory banks to facilitate access by a plurality of address and data buses associated with each memory type. The multiplexers are sized to allow access to a subset of banks in a pool by any given port such as the program memory port, left data port or right data port. The above memory architecture is designed to maximize the memory bandwidth, optimize the usage of memories, and provide high flexibility in organizing the memories. The system employs a bank switching technique to provide dynamic segmentation of the overall memory into variable size program, left data and right data memories.

Figure 3B:
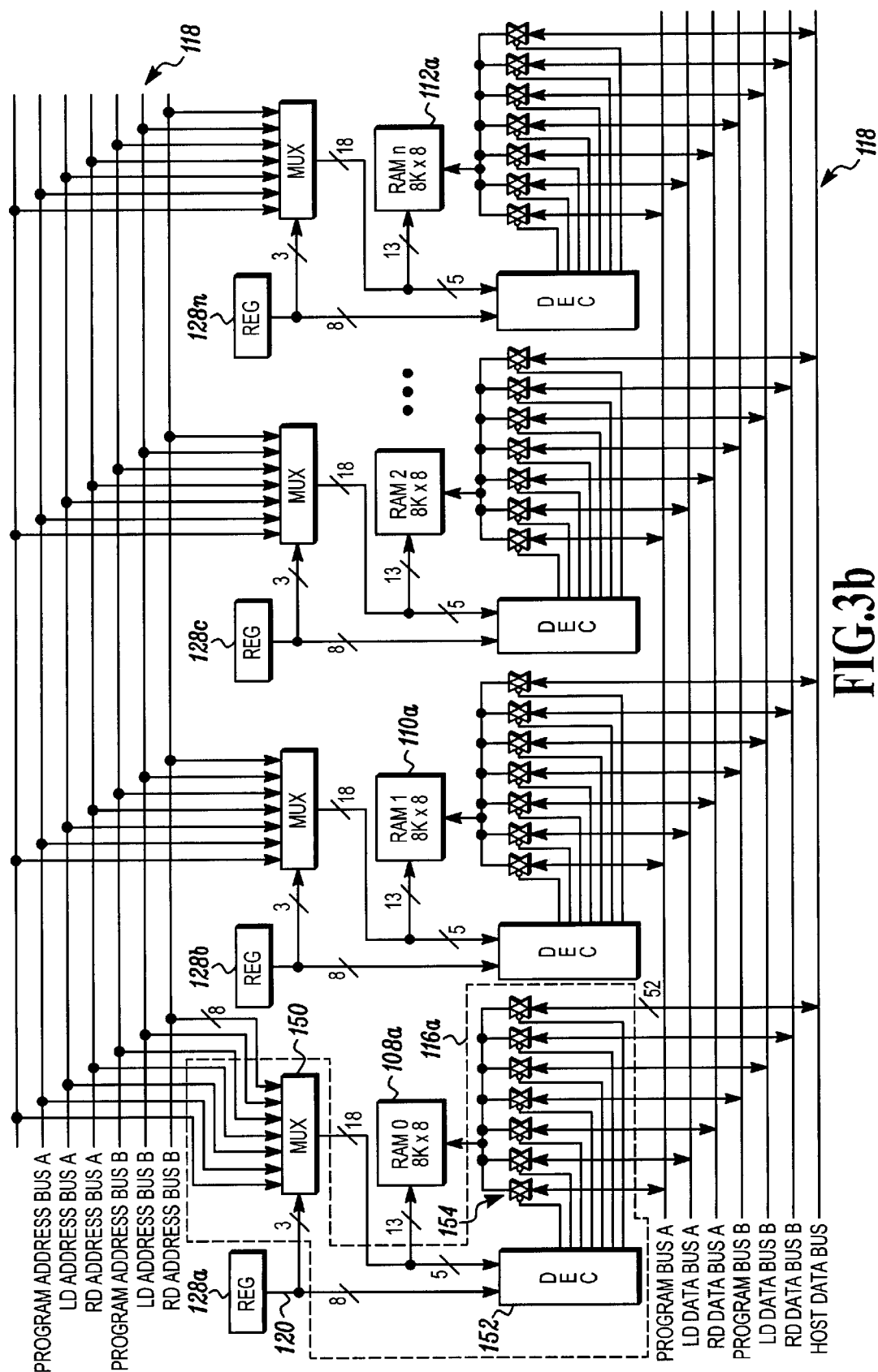
FIG. 3b is a block diagram illustrating another embodiment of a memory allocation arrangement in accordance with the invention.

FIG. 3b is a circuit diagram illustrating an example of the implementation of the switching circuits 116a–116f and the programmable selector 122 when used with multiple DSP's as shown in FIG. 3a. Each bank of memory has an 8-bit memory bank register (the memory control registers 128a–128n) which consists of 3 bits of memory identification data and 5 bits of memory bank address data. These memory bank registers are controlled and initialized by the host.

Since there is another DSP and corresponding address and data buses, a 3 bit memory type identification (ID) data arrangement is used to specify the usage type of the memory bank. For example, a 000 may be used to indicate that the memory bank is for DSPA program memory and a 101 may be used to indicate that the memory bank is DSPB program memory. Also, additional address data is used, such as five bit memory address data (ADDR), to control the mapping of the memory bank within the same type of memory block.

Again, with this technique, program memory, left data memory and right data memory can occupy multiple 8K×8 banks (or any other suitable sizes) in the overall memory, and thus provide more efficient use of memory with different DSP applications for multiple DSPS. In addition, the host can have unlimited accesses to the DSP memories and thus provide a simple mechanism for download and reloading of memory content.

It should be understood that the implementation of other variations and modifications of the invention in its various aspects will be apparent to those of ordinary skill in the art, and that the invention is not limited by the specific embodiments described. For example, not all banks need be coupled to allow use for every type of data such as program, left data and right data. Instead, specific banks may be dedicated to specific data types if desired. It is therefore contemplated to cover by the present invention, any and all modifications, variations, or equivalents that fall within the spirit and scope of the basic underlying principles disclosed and claimed herein.

What is claimed is:

1. A memory allocator comprising:
 a multiport digital processing unit having multiple address and data buses coupled to access a corresponding different type of memory space; and
 a controllable switching element, operatively coupled to the multiple address and data buses and to the different types of memory space and operatively responsive to memory type data, indicating whether the different memory space is for storing program code, left data or right data, the switching element including a switching circuit and at least one bank selecting circuit coupled to the switching circuit configured to provide programmable memory allocation of the different types of memory space for a non-corresponding set of address and data buses and to provide concurrent access to more than one set of address and data buses to each of the different types of memory spaces based on memory allocation requirement data.

2. The memory allocator of claim 1 wherein the different types of memory spaces include a plurality of banks of memory wherein each bank is a different size.

3. The memory allocator of claim 1 wherein the switching circuit includes:
 a bank address multiplexer responsive to memory type identification (ID) data that indicates which of the set of address buses to select; and
 a memory bank address decoder responsive to memory address data that controls the mapping of the memory banks.

4. The memory allocator of claim 1 wherein the bank selecting circuit selects a bank of memory based on group mapping data, including at least memory type data and bank identification data.

5. The memory allocator of claim 4 wherein the memory type data includes data representing whether memory space is for storing program code, left data or right data.

6. The memory allocator of claim 1 wherein each of the different types of memory spaces include a pool of memory banks wherein at least two banks within a pool are a same size, but wherein pool sizes are a different size than each other pool of memory.

7. The memory allocator of claim 1 including a memory usage data generator and wherein the at least one bank selecting circuit selects a bank based on memory usage data.

8. The memory allocator of claim 1 wherein each different type memory space includes at least two banks of memory and wherein the controllable switching circuit includes bank dedicated multiport multiplexers operatively coupled to each bank to facilitate the allocation of different types of memory space.

9. A memory allocator comprising:
 a first multiport digital processing unit (DSP) having multiple address and data buses coupled to access a corresponding different type of memory space wherein each of the different types of memory space includes a plurality of memory banks;
 a second multiport digital processing unit having multiple address and data buses coupled to access the corresponding different type of memory space; and a controllable switching circuit, operatively coupled to the multiple address and data buses and to each of the different types of memory space, and operatively responsive to memory type data indicating whether the different memory space is for storing program code, left data or right data and configured to provide programmable memory allocation of the different types of memory space for a non-corresponding set of address and data buses and to provide concurrent access to more than one set of address and data buses to each of the different types of memory spaces for each of the first and second DSPs wherein the controllable switching circuit includes:
- a plurality of switching circuits each operatively coupled to a corresponding memory bank; and
- at least one bank selecting circuit coupled to each of the plurality of switching circuits that select banks of memory based on memory allocation requirement data corresponding to each of the DSPs.

10. The memory allocator of claim 9 wherein switching circuit includes:
- a bank address multiplexer responsive to memory type identification (ID) data that indicates which of the set of address buses to select; and
- a memory bank address decoder responsive to memory address data that controls the mapping of the memory banks.

11. The memory allocator of claim 9 wherein the bank selecting circuit selects a bank of memory based on group mapping data, including at least memory type data and bank identification data.

12. The memory allocator of claim 11 wherein the memory type data includes data representing whether memory space is for storing program code, left data or right data.

13. The memory allocator of claim 9 including a memory usage data generator and wherein the at least one bank selecting circuit selects a bank based on memory usage data.

14. The memory allocator of claim 9 wherein each different type memory space includes at least two banks of memory and wherein the controllable switching circuit includes bank dedicated multiport multiplexers operatively coupled to each bank to facilitate the allocation of different types of memory space.

15. A method of allocating memory comprising the steps of:
- determining memory allocation requirement data for different types of memory space based on at least data representing an amount of program memory usage and data representing an amount of program memory usage and data representing an amount of data memory usage;
- determining for each type of memory space, based on the memory requirement data, whether additional memory space is required;
- providing memory type identification (ID) data that indicates which of the set of address buses to select; and
- allocating the different types of memory space for a non-corresponding set of address and data buses and providing concurrent access to more than one set of address and data buses to each of the different types of memory spaces.

16. The method of claim 15 including the step of launching a program application in response to allocating the different memory space for a non-corresponding set of address and data buses.

17. The method of claim 15 including the steps of: providing memory address data that controls the mapping of the memory banks.

18. The method of claim 15 wherein the step of allocating includes selecting a bank of memory based on group mapping data, which includes at least memory type data and bank identification data.

* * * * *